United States Patent
Gottschalk et al.

(10) Patent No.: US 7,067,017 B2
(45) Date of Patent: *Jun. 27, 2006

(54) METHOD AND SYSTEM FOR CLEANING SEMICONDUCTOR ELEMENTS

(75) Inventors: Christiane Gottschalk, Berlin (DE); Jürgen Schweckendiek, Berlin (DE); Ulrich Brammer, Berlin (DE)

(73) Assignee: MKS Instruments, Inc., Wilmington, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/892,539

(22) Filed: Jul. 15, 2004

(65) Prior Publication Data

US 2005/0056301 A1    Mar. 17, 2005

Related U.S. Application Data

(63) Continuation of application No. 09/701,854, filed on Feb. 15, 2001.

(60) Provisional application No. PCT/EP99/03893, filed on Jun. 4, 1999, now Pat. No. 6,786,976.

(30) Foreign Application Priority Data

Jun. 4, 1998    (DE) ................................ 198 25 063

(51) Int. Cl.
  *B08B 3/00*    (2006.01)
  *B08B 7/04*    (2006.01)

(52) U.S. Cl. .................... 134/30; 134/1; 134/102.1; 134/902

(58) Field of Classification Search .................. 134/1, 134/1.3, 2, 3, 10, 21, 30, 36, 102.1, 102.2, 134/902, 100.1
See application file for complete search history.

(56) References Cited

U.S. PATENT DOCUMENTS 6,080,531 A    6/2000   Carter et al. ................. 430/329
6,786,976 B1 *  9/2004  Gottschalk et al. ........... 134/10

FOREIGN PATENT DOCUMENTS

EP    0 497 247      8/1992
WO   WO 95/02895    1/1995

* cited by examiner

*Primary Examiner*—Alexander Markoff
(74) *Attorney, Agent, or Firm*—Proskauer Rose, LLP

(57) ABSTRACT

The invention relates to a method and system for cleaning semiconductor elements accommodated in a tank which uses ozonized, deionized (DI) ultrapure water. According to the invention, ozone is generated in an ozone generator (3) according to the principal of silent electric discharge while admitting highly pure oxygen. Said ozone is fed to a contactor (7) through which DI water flows. The ozone is then dissolved in the DI water. While optionally admitting additional chemicals, the ozonized DI water is conducted through the tank (12) holding the semiconductor elements in order to clean the same, and the used DI water is carried away (15). In order to stabilize the ozone concentration, $CO_2$ is added to the ozone/oxygen mixture generated by the ozone generator (7).

21 Claims, 4 Drawing Sheets

METHOD AND SYSTEM FOR CLEANING SEMICONDUCTOR ELEMENTS

RELATED APPLICATIONS

Figure 1:
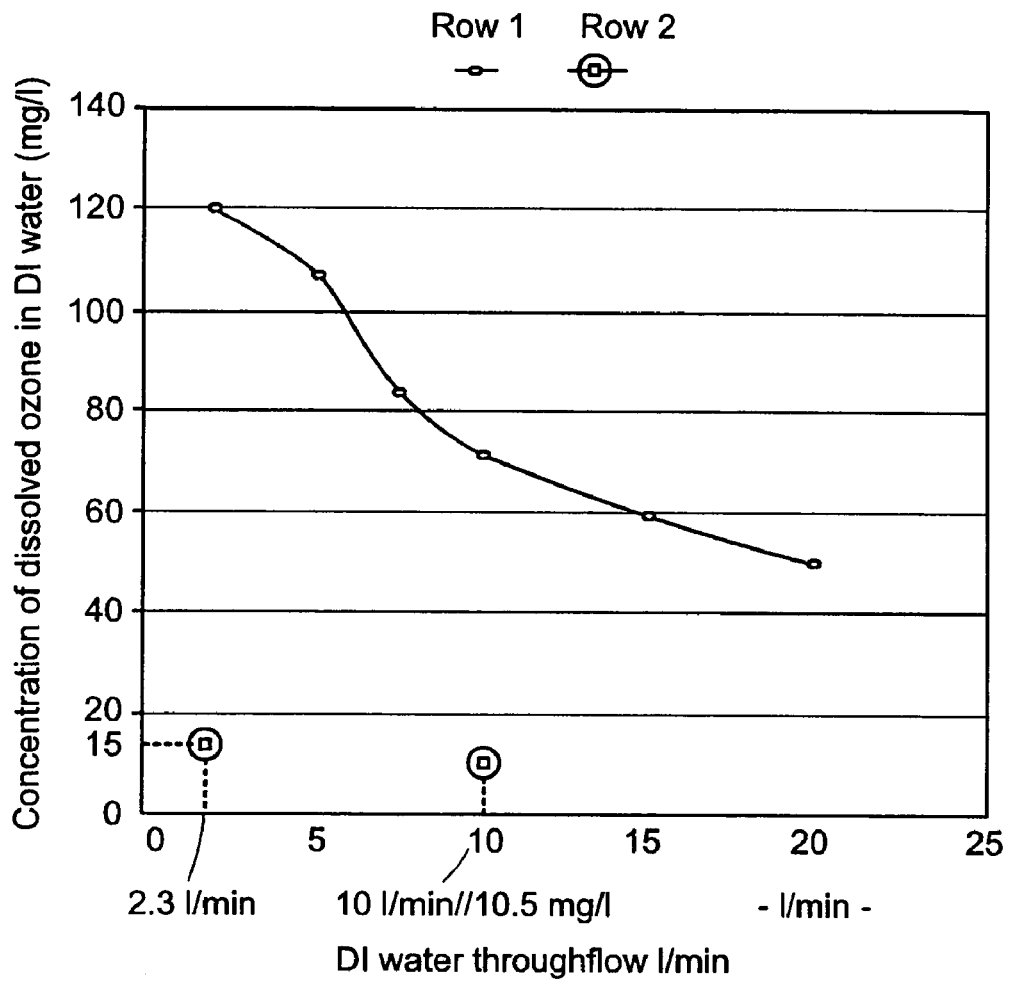

This application is a continuation of U.S. patent application Ser. No. 09/701,854, filed Feb. 15, 2001, which is a national stage application of Ser. No. PCT/EP99/03893, filed Jun. 4, 1999, now U.S. Pat. No. 6,786,976 the entire disclosures of which are incorporated herein by reference.

The invention relates to a method and a system for cleaning semiconductor elements, such as wafers or the like according to the preamble of the method claim or the device claim.

It is known that semiconductor slices are treated with liquid chemicals, in particular also ozonised, deionised (called DI in the following) water. The most varied systems for this purpose are known which comprise recirculation systems and so-called "single-pass" (one-way) systems. All of the systems have a container in which the semiconductor slices are received and through which the cleaning liquid flows, which comprises ozonised DI water and possibly other chemicals. The container can thereby be configured as an overflow tank, as a through-flow tank, as a rotary tank or the like and the supply of liquid can also be effected in the most varied manner, for example by being sprayed into the container via nozzles or being introduced via pipelines as a stream of liquid. In the case of recirculation methods, at least a part of the spent cleaning liquid is returned to circulation via filter and cleaning units, i.e. mixed with fresh ozonised DI water. The container is connected to a device for generating ozonised DI water via pipelines, in which device ozone, which is fed from an ozone generator, is dissolved in highly pure DI water.

In the case of such systems according to the state of the art, the ozone concentration in the ozonised DI water fluctuated and the inventors have set themselves the object of producing a method and a system for cleaning semiconductor elements by means of which a constantly high ozone concentration is achieved for the ozonised, deionised water which is used for cleaning.

This object is achieved according to the invention by the characterising features of the main claim and of the independent claim.

It is typical for the DI water provision in the semiconductor industry (also referred to as UPW=ultrapure water) to have extremely low conducting proportion of organic material (TOC (total organic carbon): <1 ppb), the DI water being neutral, i.e. the pH value is normally around 7.

It has been shown that the desired high ozone concentrations were not able to be produced for all of the highly pure waters used, for example, ozone concentrations of just 20 ppm were achieved, on the one hand, whereas 50 to 120 ppm were achieved on the other hand. In the case of low ozone concentrations it has been established furthermore that they depend only very little on the liquid flow volume while normally the ozone concentration increases when the flow volume becomes smaller. For example, in the case of flow volumes of 2 l/min, an ozone concentration of up to 150 ppm was achieved, with a flow volume of 10 l/min up to 70 ppm and with 20 l/min up to 40 ppm, while, in the other case with the same volumes, ozone concentrations respectively of 15 ppm, 10.5 ppm and below 20 ppm (not illustrated) were achieved.

Such a phenomenon is illustrated in FIG. 1, the characteristic lines show the ozone concentration relative to the through-flow of the DI water, "row 1" showing measured values for the expected ozone concentration and "row 2" showing measured values for an unexpected low ozone concentration.

It was hence shown that a significant ozone decomposition occurred although, because of using DI water of high purity, metal ions or metal oxides which catalyse the ozone decomposition, were not expected. The TOC value, which can be used as a measure for those substances which can reduce or consume the ozone by reaction with ozone, is small so that an appreciable loss was not expected.

Figure 2:
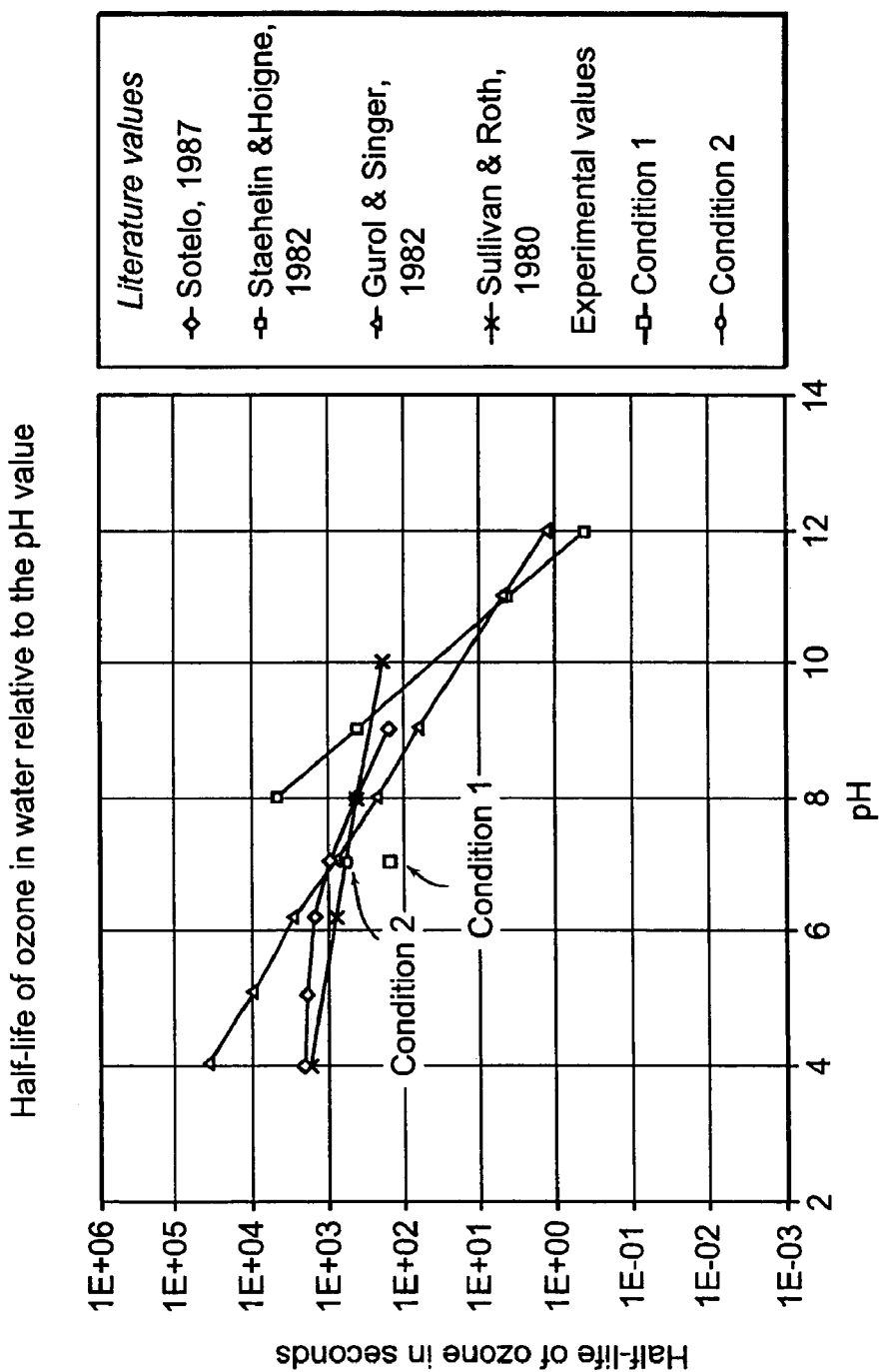

The invention is therefore based on the surprising knowledge that, although it is not to be expected on the basis of expert knowledge, the decomposition rate of the ozone is increased in various DI waters. In FIG. 2, characteristic lines are indicated for the half-lives of ozonised liquids from the literature relative to the pH value. According to these date from the literature, the calculated half-life of the ozone-decomposition is of the magnitude of approximately 1000 seconds, at a water temperature of 20° C. and a pH value of 7.

In the case of another DI water, which fulfilled the same criteria as the DI water corresponding to the literature data, namely it contained few metal ions and low pressure and also a pH value between 6.8 and 5, the decomposition rate was high, the half-life was determined to be approximately 150 seconds, as is illustrated in FIG. 2 by the measured value "Condition 1".

According to the invention, $CO_2$ was added to the ozone/oxygen mixture generated by the ozone generator. By adding $CO_2$ to the DI water, the decomposition rate was able to be reduced without substantially affecting the pH value and in fact there were achieved a half-life of approximately 750 seconds and an ozone concentration as is otherwise normal. This is shown in FIG. 2 by the measured value "Condition 2", DI water with supplement, it being able to be detected that the half-life was able to more than triple relative to the measured value "Condition 1".

Figure 3:
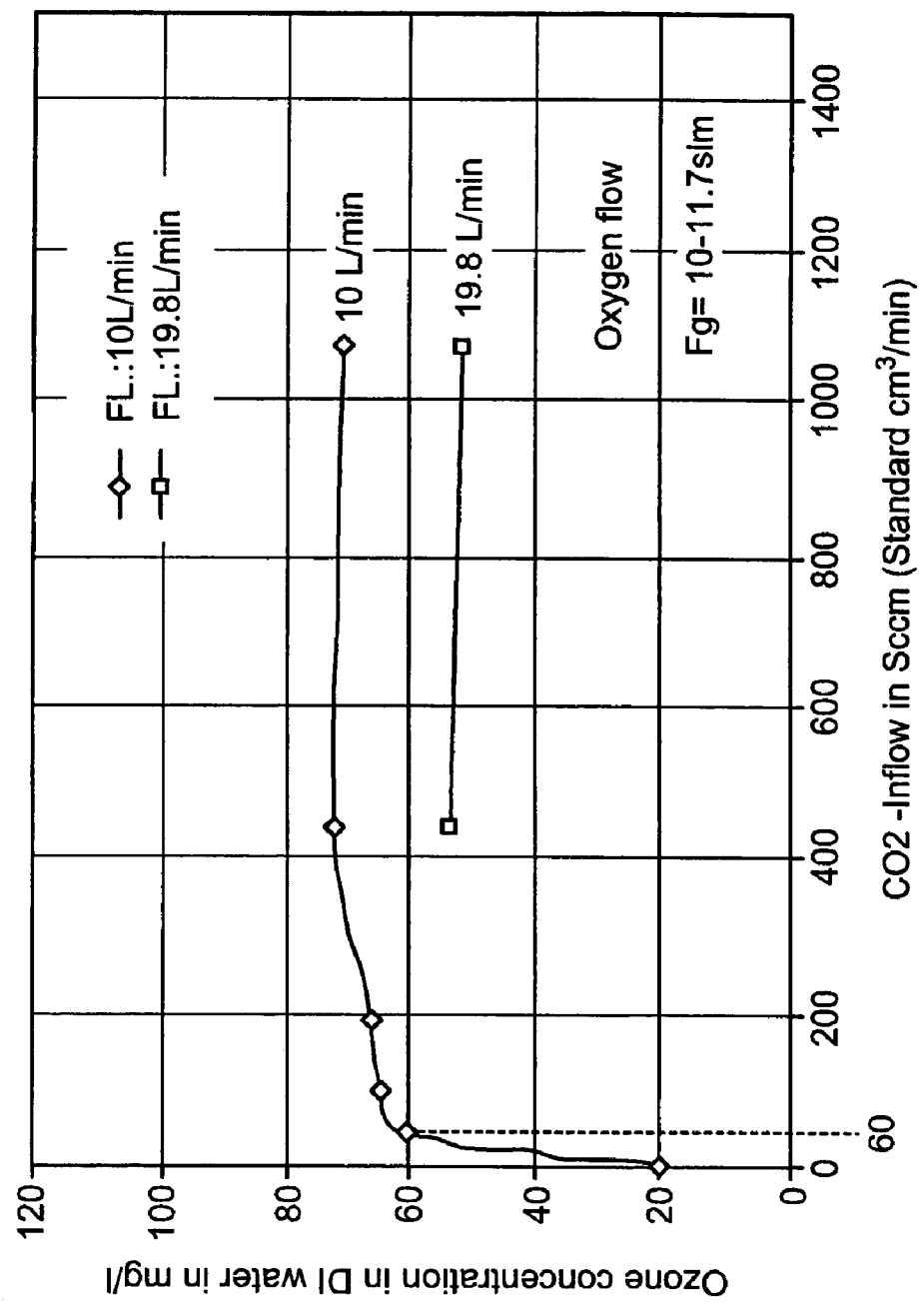

FIG. 3 shows the ozone concentration at the outlet of the system for a through-flow of 10.75 l/min relative to the dosage of the DI water with $CO_2$, the DI water without dosage showing the decomposition rate corresponding to "Condition 2" according to FIG. 2.

It can be detected from FIG. 3 that, with a dosage of less than 1% $CO_2$, the system according to the invention could already deliver a threefold ozone concentration in comparison with the DI water which has no $CO_2$ added. It is supposed that this behaviour can possibly be explained by the suppression of the radical decomposition chain of ozone, $CO_2$ as "Scavenger" slowing down the radical decomposition of ozone. It is supposed that traces of peroxides are present in the DI water which can possibly occur during UV treatment of DI water for the purpose of disinfection, when oxygen has not been completely removed during processing of the DI water. At the same time, a lowering of the pH value can be expected. deionised ultrapure water can be stabilised by the method according to the invention and the system according to the invention since, because of the supply of $CO_2$, the ozone concentration of the system according to the invention can be kept uniformly high even when using different DI waters.

Figure 4:
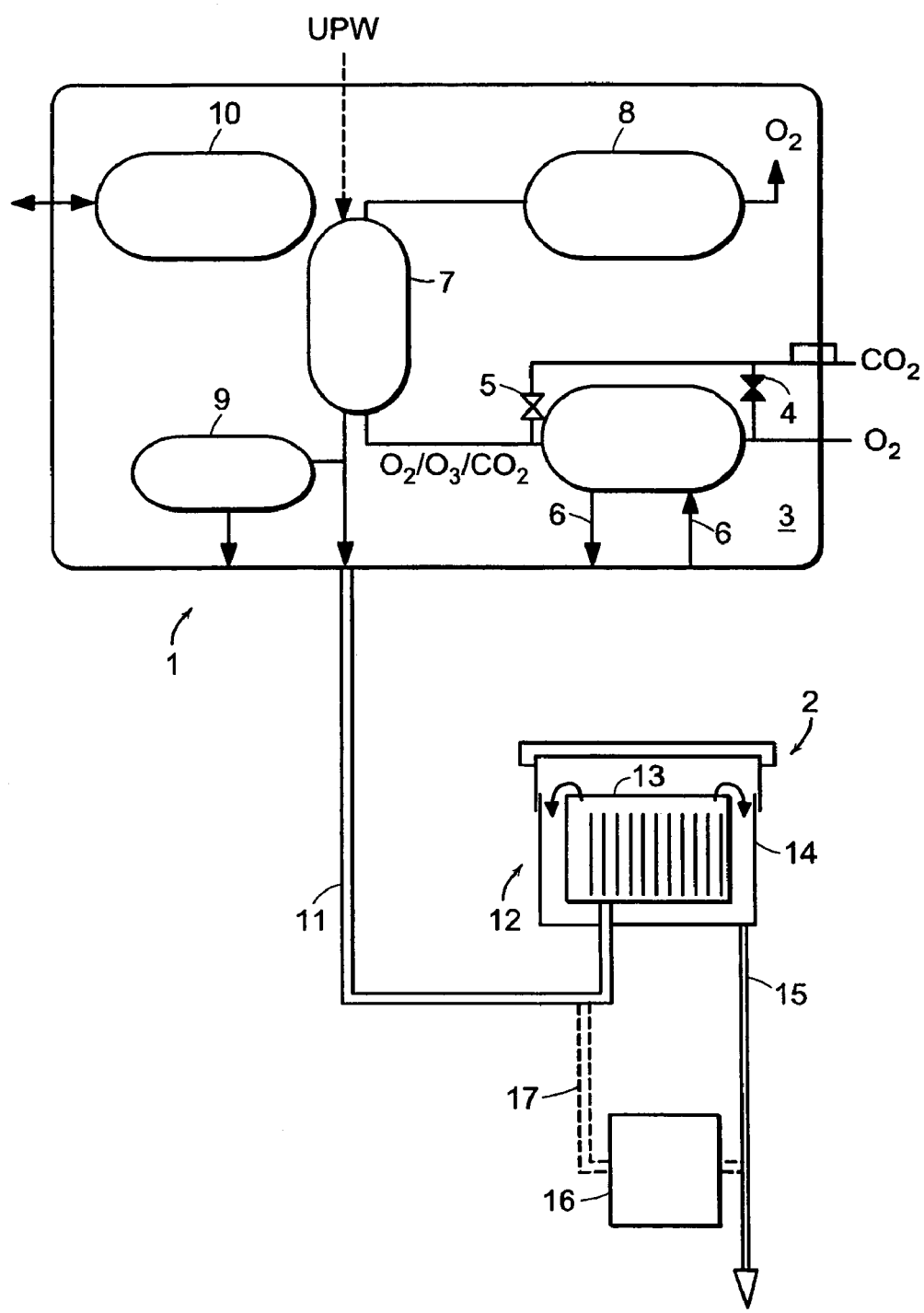

An embodiment of the system according to the invention, given by way of example, is illustrated in the drawing and the method according to the invention and the device according to the invention are explained in more detail by consulting the drawing in the subsequent description, which shows:

FIG. 1 a diagram of the dissolved ozone concentration relative to the through-flow of the DI water with two different types of DI waters, FIG. 2 a diagram of the half-lives of ozone in corresponding liquids relative to the pH value from the literature and also for the two different DI waters corresponding to FIG. 1, FIG. 3 a diagram of ozone concentration relative to the dosage of $CO_2$ for a specific through-flow of the DI water, and FIG. 4 a schematic representation of an embodiment of the system according to the invention.

The system illustrated in FIG. 4 has a device 1 for generating highly pure ozonised DI water and a device 2 for cleaning wafers or semiconductor elements, as is known from prior art. The device for generating ozonised DI water has an ozone generator 3 which operates according to the principle of silent electrical discharge. The ozone generator 3 is connected to a source of highly pure oxygen, not illustrated, and to a source of highly pure $CO_2$, not illustrated, the $CO_2$ being supplied to the inlet of the ozone generator 3 via a choke 4 and to the output of the ozone generator via a valve 5. The ozone generator 3 has a through-flow of cool water, which is represented by the arrows 6. A contactor 7 is connected to the output pipe of the ozone generator The contactor has aqueous film-forming particles in its container which offer large exchange surfaces between water and supplied ozone. The contactor 7 is pressurised.

An ozone annihilator 8 is connected to the contactor 7. Furthermore, there is provided an ozone sensor 9 which measures the ozone concentration. A control unit 10 controls the method parameters of the device 1.

The device 1 is connected to the cleaning device 2 for semiconductor elements via pipelines 11. Said cleaning device has an overflow tank 12 with an inner tank 13 and a collection tank 14. The semiconductor slices are stacked in the inner tank 13 and the pipeline 11 is connected to the inner tank 13. The overflow tank 14, which is sealed off from the surrounding air in the embodiment, has a discharge pipe 15 for spent DI water. If necessary, a part of the spent water can be returned via the recirculation pipe 17, drawn in broken lines, in which the filter and cleaning units 16 are provided.

The cleaning device 2 is represented only schematically here; of course supplementary devices, such as tanks for various chemicals, which can be added to the ozonised DI water, can be provided.

In the system illustrated in FIG. 4, the DI water (UPW), which has a low metal ion content, a small TOC proportion, a low conducting capacity and a pH value of around 7, is fed into the contactor 7, which is preferably operated at increased pressure in order to increase the solubility of ozone in DI water which is applied for example at room temperature. In the illustrated system, ozone is supplied by counterflow. In another embodiment, the ozone can also be supplied by co-current flow, although these arrangements have the disadvantage that the ozone concentration which, when leaving the contact device, remains in equilibrium with the liquid, is reduced by the quantity of dissolved ozone and consequently a lower concentration is achieved in the liquid. the principle of silent electrical discharge. In the schematic representation, the illustration of devices, which are used for pressure and flow volume control, are dispensed with. Safety and control valves and filters, which are required, are also not indicated as they are not the subject of the invention.

Highly pure $CO_2$ is added to the ozone/oxygen mixture, which is generated by the ozone generator 3, via the valve 5 and in fact in concentrations greater than 99.95%. By dosing with $CO_2$, the radical decomposition of ozone is slowed down and the pH value of the DI water is lowered.

The $O_2/O_3/CO_2$ mixture is dissolved in the DI water in the contactor 7 and excess ozone in the gas phase is reconverted into oxygen by the ozone annihilator 8 after leaving the contactor 7.

The ozone sensor 9 measures the ozone concentration in the liquid discharging from the contactor 7. The ozone-containing DI water used for the measurement is either fed back into the main flow volume or discarded by means of a waste pipe. The device 1 for generating ozonised DI water delivers, according to the selected flow volume of the DI water and the operating conditions of the system, an ozone concentration of between 50 ppm and 150 ppm.

Highly pure oxygen is supplied to the ozone generator 3, which in the case of most ozone generators operating according to the principle of silent electrical discharge, leads to a drop in the ozone concentration over its lifespan. In order to avoid this drop, $CO_2$ is introduced in such quantities via the choke 4 that, in the $O_2/CO_2$ mixture, concentrations of below 5000 ppm, preferably 300 to 1000 ppm, are achieved. Because of this supplement, the ozone generator 3 demonstrates a stable concentration behaviour over its lifespan. A larger quantity of $CO_2$ can also be added but is not essential. It was also able to be shown that, even with a supplement of 50,000 ppm $CO_2$, no disadvantageous metallic impurities were generated by the ozone generator. necessary with the addition of further chemicals, into the tank 13 and flows through the semiconductor slices with a cleaning effect. The overflow water is collected by the collection tank 14 and carried away by the discharge pipe 15. Such a flow progression is designated as "single pass", in which the spent water with the chemicals is discarded. Such a flow progression has the disadvantage that the usage of chemicals is high. Hence, a part of the spent water can be recirculated in the circulation 17 via the filter and cleaning unit 16. Such a solution has the disadvantage that, because of possible impurities, the liquid must be filtered frequently. The better solution is chosen according to each application case.

The device 2 for cleaning the semiconductor elements according to FIG. 4 is only one embodiment.

The cleaning devices, which are known from prior art and are partly described in the introduction to the description, can of course be used.

One embodiment of the invention entails a method for cleaning semiconductor elements in a tank of ozonized, deionized (DI) ultrapure water. The method includes supplying highly pure oxygen to an ozone generator that produces an ozone/oxygen mixture. The ozone generator employs a silent electrical discharge to convert oxygen into ozone. CO2 is added to the ozone/oxygen mixture that is produced by the ozone generator. The $CO_2$ can be added in a concentration of up to 10% of the ozone/oxygen mixture.

The oxygen/ozone mixture, which contains ozone and the added $CO_2$, is supplied to a contactor which has a through-flow of DI water. Ozone and $CO_2$ from the oxygen/ozone mixture dissolves in the DI water, producing ozonized DI water. Alternatively, the ozone can be supplied to the contactor in counterflow to the DI water. The ozonized DI water, possibly with the supply of further chemicals, is directed thorough the tank having the semiconductor elements in order to clean them.

The spent DI water is removed from the tank. The spent DI water can be filtered and re-circulated at least partially and can be remixed with the fresh ozonized water. The cleaning can be carried out in the tank while air is extensively or entirely excluded from the tank.

$CO_2$ can also be directed into the highly pure oxygen flow which is supplied to the ozone generator in order to achieve a stable ozone concentration behaviour of the oxygen/ozone mixture produced by the ozone generator. The $CO_2$ can be supplied in a concentration of 300 to 5000 ppm of the oxygen/$CO_2$ mixture supplied to the ozone generator.

Another embodiment of the invention entails a system for cleaning semiconductor elements. The system includes a container which receives the semiconductor elements. The container is connected to a device for generating ozonized, deionized (DI) ultrapure water via pipelines and having a discharge pipe for spent DI water. The device for generating the ozonized DI water has an ozone generator and a contactor, to which DI water is supplied and which is connected to the ozone generator. A $CO_2$ source is provided which is connected to a connection pipe, which directs the ozone/oxygen mixture between the ozone generator and the contactor via a valve in order to introduce $CO_2$.

The ozone generator can have a supply pipe for highly pure oxygen. The oxygen supply pipe can be connected to the $CO_2$ source via a control element such as a choke. The container can be configured as an overflow tank with a collection device for the spent DI water. A part of the spent DI water can be directed into the circulation via a filter and cleaning device. The container can be sealed from the environment.

The invention claimed is:

1. A method for cleaning semiconductor elements with ozonized deionized water, comprising:
   generating a mixture of ozone and oxygen;
   providing $CO_2$ to the mixture of ozone and oxygen;
   providing the mixture of $CO_2$, ozone and oxygen to a contactor;
   providing deionized water to the contactor to dissolve the mixture of $CO_2$, ozone and oxygen to produce ozonized deionized water; and
   cleaning semiconductor elements with the ozonized deionized water.

2. The method of claim 1, comprising providing deionized water to the ozonized deionized water.

3. The method of claim 1, comprising removing spent ozonized deionized water.

4. The method of claim 3, comprising filtering at least a portion of the spent ozonized deionized water and mixing at least a portion of the filtered ozonized deionized water with ozonized deionized water in the contactor.

5. The method of claim 1, comprising at least substantially excluding air from a container in which the semiconductor elements are cleaned.

6. The method of claim 1, wherein providing CO2 to the mixture of ozone and oxygen slows down the decomposition of the ozone.

7. The method of claim 1 wherein providing $CO_2$ to the mixture of ozone and oxygen comprises adding sufficient $CO_2$ to decrease the decomposition of the ozone.

8. The method of claim 7 wherein a concentration of $CO_2$ of less than about 5000 ppm is achieved in the mixture of $CO_2$, ozone and oxygen.

9. The method of claim 1, comprising converting oxygen to ozone using silent electrical discharge.

10. The method of claim 1, comprising controlling ozone concentration in the ozonized deionized water.

11. A system for cleaning semiconductor elements, comprising:
    a source of a mixture of ozone and oxygen;
    a $CO_2$ source coupled to the output of the source of a mixture of ozone and oxygen to provide $CO_2$ the mixture of ozone and oxygen and to create a $CO_2$, ozone and oxygen mixture;
    a deionized water source;
    a contractor that receives the $CO_2$, ozone and oxygen mixture and is coupled to the output of the deionized water source for dissolving the mixture of $CO_2$, ozone and oxygen in the deionized water to produce ozonized deionized water; and
    a container that contains semiconductor elements and receives the ozonized deionized water to clean the semiconductor elements.

12. The system of claim 11 wherein deionized water is provided to the ozonized deionized water.

13. The system of claim 11, comprising a filter that filters at least a portion of the spent ozonized deionized water and directs a least a portion of the filtered ozonized deionized water to be mixed with ozonized deionized water in the contactor.

14. The system of claim 11, comprising an ozone generator for converting oxygen to ozone.

15. The system of claim 14 wherein the ozone generator converts oxygen to ozone using silent electrical discharge.

16. The system of claim 11 wherein the container comprises a seal to exclude air from the container.

17. The system of claim 11 wherein providing CO2 to the mixture of ozone and oxygen slows down the decomposition of the ozone.

18. The system of claim 11 wherein providing $CO_2$ to the mixture of ozone and oxygen comprises adding sufficient $CO_2$ to decrease the decomposition of the ozone.

19. The system of claim 18 wherein a concentration of $CO_2$ of less than about 5000 ppm is achieved in the mixture of $CO_2$, ozone and oxygen.

20. The system of claim 11, comprising a control unit to control ozone concentration in the ozonized deionized water.

21. A system for cleaning semiconductor elements, comprising:
    a source of a mixture of ozone and oxygen;
    a means for mixing $CO_2$ with a mixture of ozone and oxygen to create a $CO_2$, ozone and oxygen mixture;
    a deionized water source;
    a contractor that receives the $CO_2$, ozone and oxygen mixture and is coupled to the output of the deionized water source for dissolving the mixture of $CO_2$, ozone and oxygen in the deionized water to produce ozonized deionized water; and
    a container that contains semiconductor elements and receives the ozonized deionized water to clean the semiconductor elements.

* * * * *

UNITED STATES PATENT AND TRADEMARK OFFICE
CERTIFICATE OF CORRECTION

| | |
|---|---|
| PATENT NO. | : 7,067,017 B2 |
| APPLICATION NO. | : 10/892539 |
| DATED | : June 27, 2006 |
| INVENTOR(S) | : Gottschalk et al. |

Page 1 of 1

It is certified that error appears in the above-identified patent and that said Letters Patent is hereby corrected as shown below:

On Title Page, Col. 1 Item 63 under Related U.S. Application Data and in *field number 63*, please insert --, now Pat. No. 6,786,976-- right after Feb. 15, 2001

On Title Page, Col. 1 Item 60 under Related U.S. Application Data and in *field number 60*, please delete "Provisional application" and insert --Which is a § 371 of-- and please delete ", now Pat. No. 6,786,976"

Signed and Sealed this

Nineteenth Day of September, 2006

JON W. DUDAS
*Director of the United States Patent and Trademark Office*